B. F. WARDELL.
RADIUS ROD FOR VEHICLES.
APPLICATION FILED OCT. 16, 1914.
1,318,191. Patented Oct. 7, 1919.
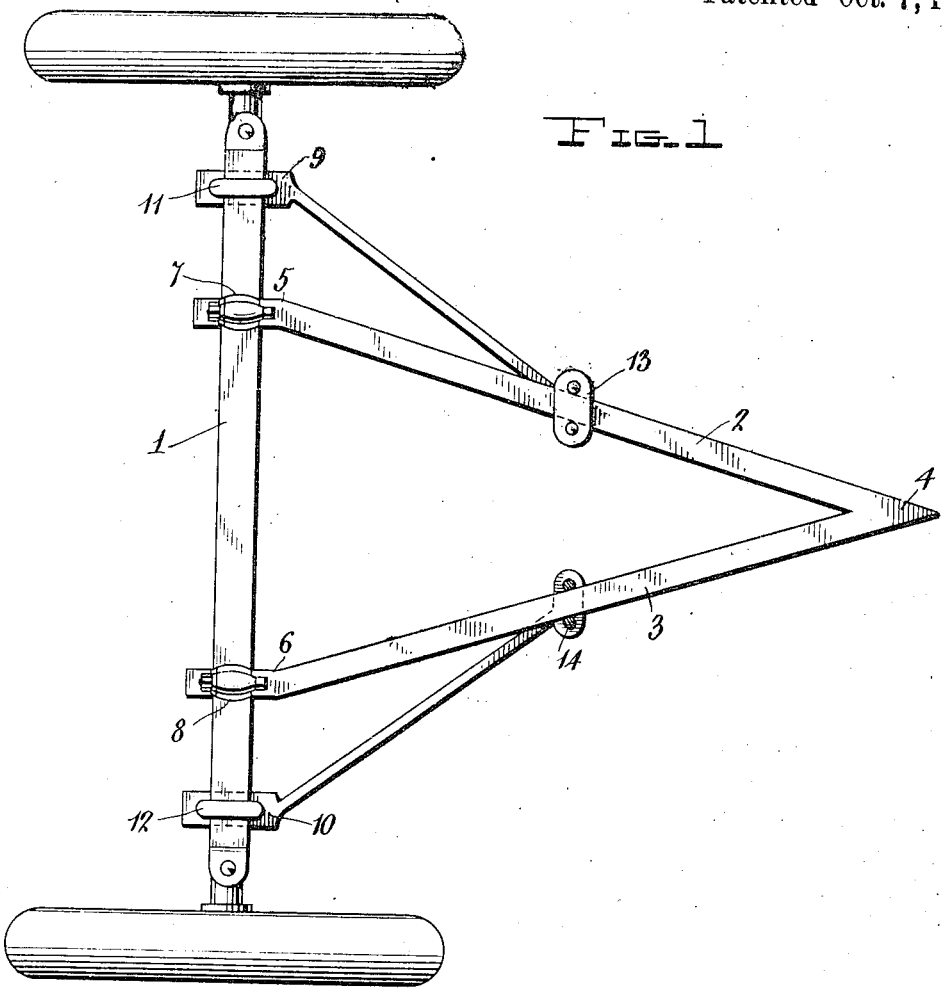
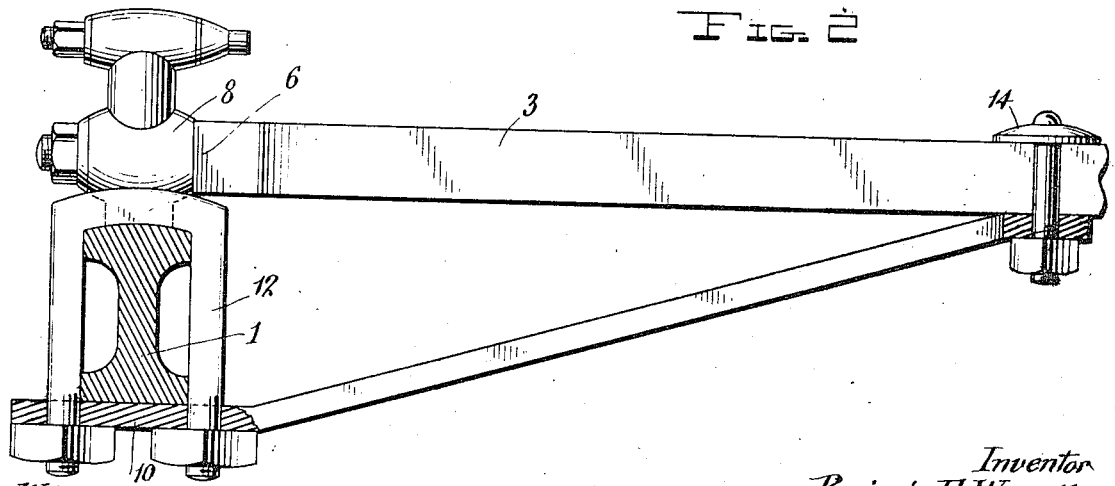
Witnesses
Inventor
Benjamin F. Wardell,
by
Attorney.

UNITED STATES PATENT OFFICE.

BENJAMIN F. WARDELL, OF SPOKANE, WASHINGTON.

RADIUS-ROD FOR VEHICLES.

1,318,191.  Specification of Letters Patent.  Patented Oct. 7, 1919.

Application filed October 16, 1914. Serial No. 866,962.

*To all whom it may concern:*

Be it known that I, BENJAMIN F. WARDELL, a citizen of the United States, residing at Spokane, in the county of Spokane and State of Washington, have invented new and useful Improvements in Radius-Rods for Vehicles, of which the following is a specification.

My present invention relates to improvements in vehicles and more especially to automobiles or motor vehicles employing or adapted to employ so-called radius rods to maintain the axle or axles in proper relation to the body of the vehicle, and the object of the present invention is to provide means for insuring the maintenance of correct relation between the axle or axles whereby proper riding action of the vehicle is obtained, the control thereof, especially on rough roads, is rendered easy and safe, strain on the steering gear is minimized, strain and vibration of the radius rods are avoided, and liability of breakage of the radius rods is reduced to a minimum, although should breakage of one of the radius rods of a member thereof occur, the serviceability of the vehicle would not be impaired.

To these and other ends, the invention consists in certain improvements, and combinations and arrangements of parts, all as will be hereinafter more fully described, the novel features being pointed out particularly in the claim at the end of the specification.

In the accompanying drawing:—

Figure 1 is a top plan view of a portion of the running gear of the vehicle embodying the present invention;

Fig. 2 is a detail view on an enlarged scale showing the axle in section and indicating one way of attaching the members of the radius rods to the axle.

Similar parts are designated by the same reference characters in the several views.

The present invention is applicable generally to vehicles of the type employing or adapted to employ radius rods, and in the accompanying drawing one embodiment of the invention is shown as applied to the front axle of an automobile or motor vehicle. In the present instance, 1 designates the front axle, and 2 and 3 designate the radius rods, these rods in the present instance being joined at 4 at which point they are anchored or attached to the frame or body of the vehicle. According to the present invention, each radius rod is branched whereby it is attached to the axle by two members. In the construction shown, the ends 5 and 6 of the rods 2 and 3 are secured to the axle by the clips 7 and 8, and the ends 9 and 10 are secured to the axle by the clips 11 and 12. In some constructions already in use, the radius rods are each connected at one point to the axle, and the present invention can be readily applied in such cases by forming the members 9 and 10 as braces which are secured rigidly to the radius rods 2 and 3 at points intermediate their ends by clips 13 and 14. In such cases, the ends 9 and 10 of the braces preferably engage the axle at the outer sides of the axle-engaging ends 5 and 6 of the usual radius rods. Also where, as in the construction shown, the usual radius rods are secured to the axle by clips placed on top thereof, it is preferable to arrange the braces at the under side of the axle, as appears clearly from Fig. 2. However, the braces may engage the axle either directly beneath the points where the usual radius rods engage the axle or at any other suitable points where they will serve as braces or stays to support the usual radius rods, will prevent vibration of the rods, and will also prevent tilting of the axle, particularly when passing over rough roads. Where vehicles are equipped with radius rods embodying the present invention in the first instance the braces can be formed as parts of the radius rods, that is to say, each radius rod will have branches or forks which are secured to the axle. By attaching the members of the radius rods to the axle at different points, the axle is rigidly held in correct relation to the frame or body of the vehicle, and tilting or other displacement of the axle which would tend to strain the steering gear of the vehicle or interfere with the steering thereof is avoided.

I claim as my invention:—

In a vehicle, the combination with an axle, of a main radius rod comprising a pair of members converging and united at their rear ends and adapted for attachment at such point to the body of the vehicle, said members diverging at their forward ends and having means for securing them at the upper side of the axle, and a pair of branch arms diverging outwardly and downwardly relatively to the respective members of the main radius rod, the rear end of each branch arm being fixed to the respective member of the main radius rod at a point substantially midway between the points of attachment of the main member to the axle and the body, respectively, and the forward end of each branch arm being fixed to the underside of the axle at a point offset laterally of the outer side of the point of connection to the axle of the respective member of the main radius rod.

In testimony whereof I have hereunto set my hand in presence of two subscribing witnesses.

BENJAMIN F. WARDELL.

Witnesses:
E. J. DOCKERY,
HARRY L. FISHER.